C. B. DAVIS.
BREWING APPARATUS, &c.
APPLICATION FILED AUG. 12, 1912.

1,102,647.

Patented July 7, 1914.

Witnesses:
H. Veronica Fitzpatrick
Mary H. Lins

Charles B. Davis
Inventor
By his Attorney Frank J. Kent

UNITED STATES PATENT OFFICE.

CHARLES B. DAVIS, OF NEW YORK, N. Y.

BREWING APPARATUS, &c.

1,102,647.

Specification of Letters Patent. Patented July 7, 1914.

Application filed August 12, 1912. Serial No. 714,566.

*To all whom it may concern:*

Be it known that I, CHARLES B. DAVIS, a citizen of the United States, residing at New York city, in the county of New York and State of New York, have invented certain new and useful Improvements in Brewing Apparatus, &c., of which the following is a specification.

My present invention relates to brewing apparatus, etc., and more specifically to apparatus for sieving or straining a liquid from solids. For example, in brewing, my improvement may be used with advantage in the mash-tun for straining the extract from the spent grains or husks.

Some of the advantages of my sieve are that it does not clog, and the operation of the sieve does not substantially disturb the mash. These and other features and advantages of my improvement will be apparent to those skilled in the art from an understanding of the following description in connection with the drawings which show only two of the specific embodiments which my improvements are adapted to take.

Figure 1:
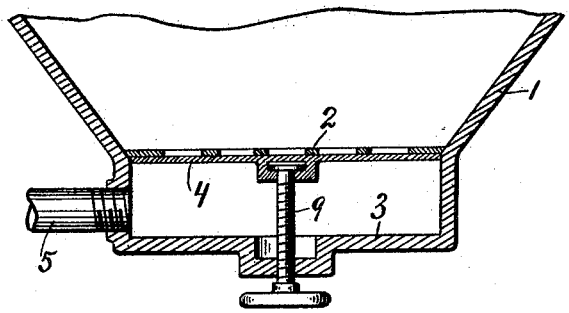
Figure 2:
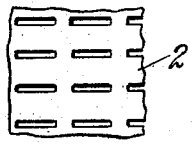
Figure 3:
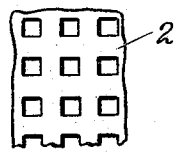
Figure 4:
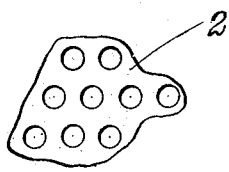

Figure 1 is a vertical section of a mash-tun having its bottom fitted with my improved sieve means; Figs. 2, 3 and 4 are plan views of sieve plates showing some of the different forms of perforations that may be used.

I will now describe the specific devices of the drawings, reserving it to the claims to point out the novel features and to define the scope of the invention, it being understood that the claims will be given the due range of equivalents to which they may be entitled in view of the art.

Referring to the numerals on the drawings, 1 is a tun adapted to receive the grains and water, in which the mashing operation is adapted to take place.

2 is a perforated plate or sieve supported horizontally across the interior of the tun above its bottom 3.

4 is a controlling member in the shape of a vertically movable gate carried up and down by a screw 9 tapped through the bottom of the tun. This member 4 may be an imperforate plate, so that when it is moved into contact with the sieve 2 filtration will be checked; when the member 4 is adjusted below the outlet 5, the filtration takes place freely.

Figs. 2, 3 and 4 show some of the forms that the perforations in the sieve may take,—oblong, square or round. Further, the apertures are large to avoid being clogged during the mashing operation which occurs while the gate means below the sieve is closed. The elongated grains straddle across the large square and round perforations in any direction; and straddle across at least the width of the oblong perforations. After the mashing operation has been completed, the gates are opened and it is evident that this can be accomplished without disturbing the mash because the gates are below the sieve.

What I claim is:

1. Apparatus for separating a liquid from solids comprising a sieve, and a member adapted to come into flat contact with said sieve to close its perforations, and means for moving said sieve and member toward and away from each other.

2. Apparatus for separating a liquid from solids comprising a sieve, a member in superposed relation to the sieve, and means for causing relative movement between the sieve and the member to space them apart or bring them close together in such superposed relation.

3. In apparatus of the kind described, a sieve and a controlling member in superposed relation, one fixed and the other movable, whereby the sieve and the member may be brought into close contact or spaced apart in such superposed relation.

4. In apparatus of the kind described, a sieve and a controlling member having portions in superposed relation, and means for approaching such portions more or less closely toward each other.

In testimony whereof I affix my signature in presence of two witnesses.

CHARLES B. DAVIS.

Witnesses:
 CHARLES H. WEAVER,
 WM. C. ROGERS.

---

Copies of this patent may be obtained for five cents each, by addressing the "Commissioner of Patents, Washington, D. C."